US012594989B2

(12) United States Patent
Vogt et al.

(10) Patent No.: US 12,594,989 B2
(45) Date of Patent: Apr. 7, 2026

(54) COMPENSATION SYSTEM FOR COMPENSATING TRAILER SWAY OF A VEHICLE TRAILER OF A TOWING VEHICLE

(71) Applicant: ZF Friedrichshafen AG, Friedrichshafen (DE)

(72) Inventors: Dominik Vogt, Meckenbeuren (DE); Eric Leblanc, Belleville, MI (US)

(73) Assignee: ZF Friedrichshafen AG, Friedrichshafen (DE)

( * ) Notice: Subject to any disclaimer, the term of this patent is extended or adjusted under 35 U.S.C. 154(b) by 13 days.

(21) Appl. No.: 18/580,917

(22) PCT Filed: Jul. 8, 2022

(86) PCT No.: PCT/EP2022/069037
§ 371 (c)(1),
(2) Date: Jan. 19, 2024

(87) PCT Pub. No.: WO2023/001584
PCT Pub. Date: Jan. 26, 2023

(65) Prior Publication Data
US 2024/0359736 A1 Oct. 31, 2024

Related U.S. Application Data

(60) Provisional application No. 63/224,727, filed on Jul. 22, 2021.

(51) Int. Cl.
B62D 7/15 (2006.01)
(52) U.S. Cl.
CPC .................................. B62D 7/159 (2013.01)

(58) Field of Classification Search
CPC ......... B62D 7/159; B62D 37/00; B62D 53/00
See application file for complete search history.

(56) References Cited

U.S. PATENT DOCUMENTS 9,566,911 B2 * 2/2017 Greenwood ........... H04N 23/54
2005/0055138 A1 3/2005 Lee et al.
(Continued)

FOREIGN PATENT DOCUMENTS

DE 10 2019 209 380 A1 12/2020
WO 2006000578 A1 1/2006

OTHER PUBLICATIONS

International Search Report corresponding to PCT/EP2022/069037 mailed Nov. 18, 2022.
(Continued)

*Primary Examiner* — Long T Tran
(74) *Attorney, Agent, or Firm* — Finch & Maloney PLLC

(57) ABSTRACT

The present concept relates to a compensation system (105) for compensating a trailer sway (107) of a vehicle trailer (110) for a towing vehicle (100). The compensation system (105) comprises a read-in interface (115) and a compensation device (120). The read-in interface (115) is designed to read in a vehicle yaw-rate signal (125) that represents a vehicle yaw-rate and/or a vehicle yaw-rate change of the towing vehicle (100). The compensation device (120) is designed to determine a superposition angle (200) for superposition on a rear-axle steering angle (130) of the towing vehicle (100), when at least the vehicle yaw-rate and/or the vehicle yaw-rate change is within a defined yaw-rate fluctuation range, and/or to emit the superposition angle in the form of a superposition angle signal (135) to a rear-axle steering device (140) of the towing vehicle (100), in order to enable the compensation of the trailer sway (107).

16 Claims, 4 Drawing Sheets

(56) References Cited

U.S. PATENT DOCUMENTS

| | | | | |
|---|---|---|---|---|
| 2006/0273657 | A1* | 12/2006 | Wanke | B60T 8/17555 |
| | | | | 303/146 |
| 2008/0036296 | A1 | 2/2008 | Wu et al. | |
| 2009/0210112 | A1* | 8/2009 | Waldbauer | B60T 8/1708 |
| | | | | 701/42 |
| 2013/0261919 | A1* | 10/2013 | Miyata | B60W 10/184 |
| | | | | 701/70 |
| 2014/0136052 | A1 | 5/2014 | Kossira et al. | |
| 2016/0023525 | A1* | 1/2016 | Lavoie | B60D 1/305 |
| | | | | 701/70 |
| 2017/0174128 | A1* | 6/2017 | Hu | G06T 7/60 |
| 2017/0272664 | A1* | 9/2017 | Lang | H04N 23/63 |
| 2021/0146998 | A1* | 5/2021 | Niewiadomski | G06V 20/588 |
| 2022/0001921 | A1* | 1/2022 | Nakano | B60T 7/20 |
| 2022/0063720 | A1* | 3/2022 | Oh | B60D 1/245 |
| 2022/0355789 | A1* | 11/2022 | Schmidt | B60T 8/1708 |
| 2023/0166700 | A1* | 6/2023 | Bennati | B60T 8/172 |
| | | | | 701/70 |

OTHER PUBLICATIONS

Written Opinion corresponding to PCT/EP2022/069037 mailed Nov. 18, 2022.

* cited by examiner

COMPENSATION SYSTEM FOR COMPENSATING TRAILER SWAY OF A VEHICLE TRAILER OF A TOWING VEHICLE

FIELD OF THE INVENTION

The present concept relates to a compensation device for compensating trailer sway of a vehicle trailer of a towing vehicle.

BACKGROUND OF THE INVENTION

WO 2006/000578 A1 describes a method for stabilizing a towing vehicle.

SUMMARY OF THE INVENTION

Against that background, the present approach provides an improved compensation system for compensating trailer sway of a vehicle trailer of a towing vehicle, an improved method for compensating trailer sway of a vehicle trailer of a towing vehicle, and a rear-axle steering system, in accordance with the principal claims. Advantageous design features emerge from the subordinate claims and from the description that follows.

The advantages that can be achieved with the concept proposed are that a trailer sway of a vehicle trailer can be recognized particularly reliably and prevented or at least reduced by using a rear-axle steering device of a towing vehicle.

A compensation system for compensating trailer sway of a vehicle trailer of a towing vehicle comprises a read-in interface and a compensation device. The read-in interface is designed to read in a yaw-rate signal of a vehicle that represents a vehicle yaw-rate and/or a vehicle yaw-rate change of the towing vehicle. The compensation device is designed to determine a superposition angle for superposing on a rear-axle steering angle of the towing vehicle, when at least the vehicle yaw-rate and/or vehicle yaw-rate change are within a defined vehicle yaw-rate fluctuation range, and/or to send the superposition angle in the form of a superposition angle signal to a rear-axle steering device of the towing vehicle in order to enable the trailer sway to be compensated.

When using a towing vehicle with a vehicle trailer, depending on the loading condition and further influences such as the speed of the vehicle, side-wind, the length of the tractor-trailer combination, etc., sway or whipping of the vehicle trailer can take place. This sway can adversely affect the driving behavior of the towing vehicle and limit the extent to which the towing vehicle can be controlled. The compensation system proposed herein advantageously enables such trailer sway to be reduced, or even prevented, in order to increase the driving safety.

The vehicle yaw-rate or vehicle yaw-rate change within the vehicle yaw-rate fluctuation range can be a vehicle yaw-rate or vehicle yaw-rate change that represents a typical amount of trailer sway, i.e., one that can be detected at the towing vehicle as an undesirably pronounced sway or whipping of the vehicle trailer. Accordingly, the vehicle yaw-rate or vehicle yaw-rate change within the vehicle yaw-rate fluctuation range is to be understood as a vehicle yaw-rate or vehicle yaw-rate change caused by the sway of the trailer, which is manifested, for example, by a tugging of the towing vehicle at the rear by the vehicle trailer. Such vehicle yaw-rates or vehicle yaw-rate changes within the vehicle yaw-rate fluctuation range can be termed or interpreted as unacceptable yaw-rates. For example, a vehicle yaw-rate or vehicle yaw-rate change within the vehicle yaw-rate fluctuation range can be at, or in excess of a defined maximum yaw-rate threshold value or maximum yaw-rate change threshold value of the towing vehicle.

The rear-axle steering device can be an active rear-axle steering system, such as a steer-by-wire steering system, that acts centrally on the two wheels of an axle. This steer-by-wire steering system can comprise at least one actuator, which can change the wheel steering angle of the wheels arranged at the ends of the axle. Alternatively, each wheel, at the end of the axle, can have an actuator of its own for changing the wheel steering angle.

A superposition angle can be understood to mean an angle which is superimposed on a specified steering lock angle of the wheels of the rear axle. The superposition can result in a reduction or even an increase of the specified steering lock angle. The superposition angle can serve to compensate whipping of the towing vehicle brought about by the trailer sway, for example to reduce and/or stabilize it. The rear-axle steering angle can be varied, for example by superposition with the superposition angle, in such a manner as to produce a total steering lock angle of the wheels of the rear axle which is more stable with regard to swaying movements.

When the read-in interface reads in a vehicle yaw-rate signal that represents a vehicle yaw-rate and/or a vehicle yaw-rate change which is outside the vehicle yaw-rate fluctuation range, the compensation device can remain inactive or be deactivated, so that no superposition angle is determined for superposition on the rear-axle steering angle set by the rear-axle steering device. Such a vehicle yaw-rate and/or vehicle yaw-rate change outside the vehicle yaw-rate fluctuation range leads to the conclusion that no trailer sway, or at least none that is relevant for stabilization purposes, is taking place. To recognize a vehicle yaw-rate and/or vehicle yaw-rate change within the vehicle yaw-rate fluctuation range, the compensation device can comprise a recognition device in which corresponding comparison values, such as the maximum yaw-rate threshold value and/or the maximum yaw-rate change threshold value, are stored, or from which they can be called up.

Furthermore, the compensation system can comprise a recognition device which, using the vehicle yaw-rate signal, to recognize a vehicle yaw-rate and/or vehicle yaw-rate change within the defined vehicle yaw-rate fluctuation range as an unacceptable yaw-rate, and/or using the unacceptable yaw-rate and/or using at least one steering-wheel angle signal that represents a set steering-wheel angle of the towing vehicle, and/or a speed signal that represents a vehicle speed of the towing vehicle, and/or a steering-wheel angular speed signal that represents a steering-wheel angular speed of a steering-wheel angle of the towing vehicle, is designed to emit by means of an activation device an activation signal for activating the compensation device. Thus, the unacceptable yaw-rate or a number of different driving parameters can serve to enable recognition of the trailer sway and/or the compensation is activated only after such a recognition.

According to an embodiment, the compensation device can be designed to be activated in response to an activation signal, or to the activation signal from a recognition device, or from the recognition device, in order to determine the superposition angle. In an embodiment, the compensation device can be designed so that it is only activated in response to the activation signal, and/or so that it remains inactive or is inactivated when there is no such activation signal. In that way, the compensation device can be activated only when trailer sway has, in fact, been recognized, and the operational energy of the compensation device can in that way be reduced as a whole.

It is also advantageous if, in accordance with an embodiment, the compensation system comprises a limiting device which is designed to limit the superposition angle determined by the compensation device, and/or a total angle to be superposed or which has been superposed with the superposition angle, in relation to an angle size and/or an angular speed of a steering orientation rate of a wheel. In that way, when superposition takes place the rear-axle steering angle can be prevented from exceeding a maximum total angle, or the steering angle can be prevented from changing too rapidly, which would result in additional and undesired whipping of the (towing) vehicle.

Furthermore, the compensation device can comprise at least a filter system, a differentiation device, a mixer and/or an unacceptable-yaw-rate recognition unit with a regulator, wherein the filter system is designed, using the vehicle yaw-rate signal, to provide a filter signal that corresponds to a defined frequency range of the trailer sway, and/or the differentiation device is designed to differentiate the filter signal in order to obtain a differentiated signal, and/or the mixer is designed to mix the differentiated signal with a further signal or to amplify the differentiated signal, and/or the unacceptable-yaw-rate recognition unit is designed to interpret the vehicle yaw-rate and/or vehicle yaw-rate change in the defined frequency range as an unacceptable yaw-rate, and/or the regulator is designed to compensate the vehicle yaw-rate and/or vehicle yaw-rate change which has been interpreted as an unacceptable yaw-rate, in order to determine the superposition angle. This enables a practicable technical implementation of the superposition angle determination. The filter system can be designed, by way of a filter cascade, to isolate a frequency range characteristic of trailer sway as the defined frequency range, in order to determine the filter signal.

For example, the filter system can comprise at least a high-pass filter and/or a low-pass filter. Thus, characteristic high and low frequencies can be isolated for the trailer sway and used in a special way for further processing.

The unacceptable-yaw-rate recognition unit can be designed to operate the regulator using a stored set-point unacceptable-yaw-rate value, in order to determine the superposition angle signal. The set-point unacceptable-yaw-rate value can be zero. In that way, a superposition angle can be determined which does not permit any repeated unacceptable yaw-rate.

The regulator can comprise as a part-regulator at least a P-control function, an I-control function and/or a D-control function, such that the regulator can, in particular, be in the form of a PID controller. Such an embodiment has the advantage, for the design of the controller, of being able to have recourse to already well-researched and reliably working technical concepts. In this context PID controllers have the advantage, on the one hand, of not being characterized by any permanent control deviation (due to the I component, compared with a pure P controller), and also of being able to react dynamically to changed control deviations (due to the D component, compared with a pure P controller).

According to an embodiment, the recognition device can comprise a condition-checking device and an activation device, which latter is designed to emit an activation signal for activating the compensation device when at least one condition of the condition-checking device is fulfilled, in particular when as the said condition the vehicle yaw-rate reaches or exceeds a maximum yaw-rate threshold value, and/or when the vehicle yaw-rate change reaches or exceeds a maximum yaw-rate change threshold value, and/or a steering-wheel angular speed of the towing vehicle reaches or exceeds a maximum steering-wheel angular speed threshold value, and/or a difference between the vehicle yaw-rate and a determined set-point yaw-rate reaches or exceeds a maximum difference threshold value. In that way, the trailer sway can be recognized quickly and simply by interrogating typical conditions for trailer sway. For that purpose, the recognition device can comprise respectively associated threshold comparison devices for comparing with the respective stored threshold values. In an embodiment, reaching or exceeding the maximum difference threshold value can be interpreted as representing an unacceptable yaw-rate. According to an embodiment, the activation device can be designed to emit the activation signal only when a particular number, or all of the existing conditions are fulfilled. To determine the unacceptable yaw-rate, the recognition device can be designed to determine the set-point yaw-rate by means of a vehicle model on the basis of the vehicle speed and the steering-wheel angle of the towing vehicle.

It is also advantageous if, in accordance with an embodiment, the activation device is designed to emit the activation signal for a predetermined time period. The said (pre)-determined time period can be, for example, a minimum activation time. The output of the activation signal only for a defined time period makes it possible to determine the superposition angle afresh again after the lapse of the (pre)-determined time period, and in that way to constantly update the trailer sway compensation. A minimum activation time can serve to provide a suitable time period for compensating the rear-axle steering angle.

In addition, the recognition device can comprise a deactivation device, which is designed to emit a deactivation signal for deactivating the compensation device when the condition is not fulfilled and/or, from the time when the activation signal is emitted, when a (pre)-determined time period has lapsed. For example, the deactivation device can be designed to emit the deactivation signal when, after the lapse of the minimum activation time, an amplitude of the trailer sway is below a threshold value and/or, after the lapse of the minimum activation time, the superposition angle is below a threshold value. In that way, the compensation device can advantageously be deactivated when, after a trailer sway has been compensated, the vehicle trailer is no longer swaying or whipping.

According to a further aspect of the invention, a rear-axle steering system comprises a rear-axle steering device and a compensation device designed in one of the variants described above. The rear-axle steering device can be an active rear-axle steering system for a vehicle, preferably in the form of a steer-by-wire steering system. Using the compensation device, such a rear-axle steering system can reliably recognize trailer sway and reduce or prevent it by means of the rear-axle steering device.

A further aspect of the invention is a steer-by-wire steering system. A steer-by-wire steering system is, for example, an electro-mechanical unit decoupled from any mechanical handling device such as a steering wheel. By virtue of steering signals and having regard to one or more parameters, such as a vehicle speed and/or a vehicle acceleration, a steering wheel angle and/or a steering wheel angular speed, currently existing steering angles at the front and/or rear axle, a yaw-rate and/or transverse acceleration of the vehicle, etc., steering signals are generated in a control unit. The steering movement takes place by means of at least one actuator of the steer-by-wire steering system, which receives steering signals from the control unit. In the actuator, for example, a spindle drive can linearly displace a spindle or steering rod which is directly or indirectly articulated to wheel carriers. By virtue of the displacement of the spindle the wheel carriers can be pivoted about their vertical axis so that the wheels mounted to rotate on the wheel carriers can be acted upon by a change of the wheel steering angle of the wheel carrier concerned.

A further aspect of the invention is a method for compensating a trailer sway of a vehicle trailer for a towing vehicle and comprises a read-in step and a determination step. In the read-in step a vehicle yaw-rate signal is read in, which signal represents a vehicle yaw-rate and/or a vehicle yaw-rate change of the towing vehicle. In the determination step a superposition angle for superposing on a rear-axle steering angle of the towing vehicle is determined, when the vehicle yaw-rate and/or vehicle yaw-rate change is within a defined vehicle yaw-rate fluctuation range. In addition or alternatively the superposition angle is sent in the form of a superposition angle signal to a rear-axle steering device of the towing vehicle in order to enable the trailer sway to be compensated.

This method can be implemented, for example, in the form of software or hardware or in a mixed form consisting of software and hardware, for example in a control unit. The control unit can operate the compensation device and hence also the rear axle steering device in accordance with one or more of the above-described variants or embodiments. By way of the compensation device, such a rear axle steering device makes it possible to drive a towing vehicle with a trailer exceptionally safely.

Advantageously also, a computer program product with program codes can be stored on a machine-readable support such as a semiconductor memory, a hard-drive memory or an optical memory, and used in accordance with one of the embodiments described above to carry out the method when the program is run on a computer or suitable device.

BRIEF DESCRIPTION OF THE DRAWINGS

Example embodiments of the concept presented here are represented in the drawings and explained in greater detail in the description that follows. The drawings show.

DETAILED DESCRIPTION OF THE PREFERRED EMBODIMENTS

In the following description of preferred example embodiments of the present concept, the same or similar indexes are used for elements with a similar action shown in the various figures, so that repeated descriptions of the said elements can be dispensed with.

Figure 1:
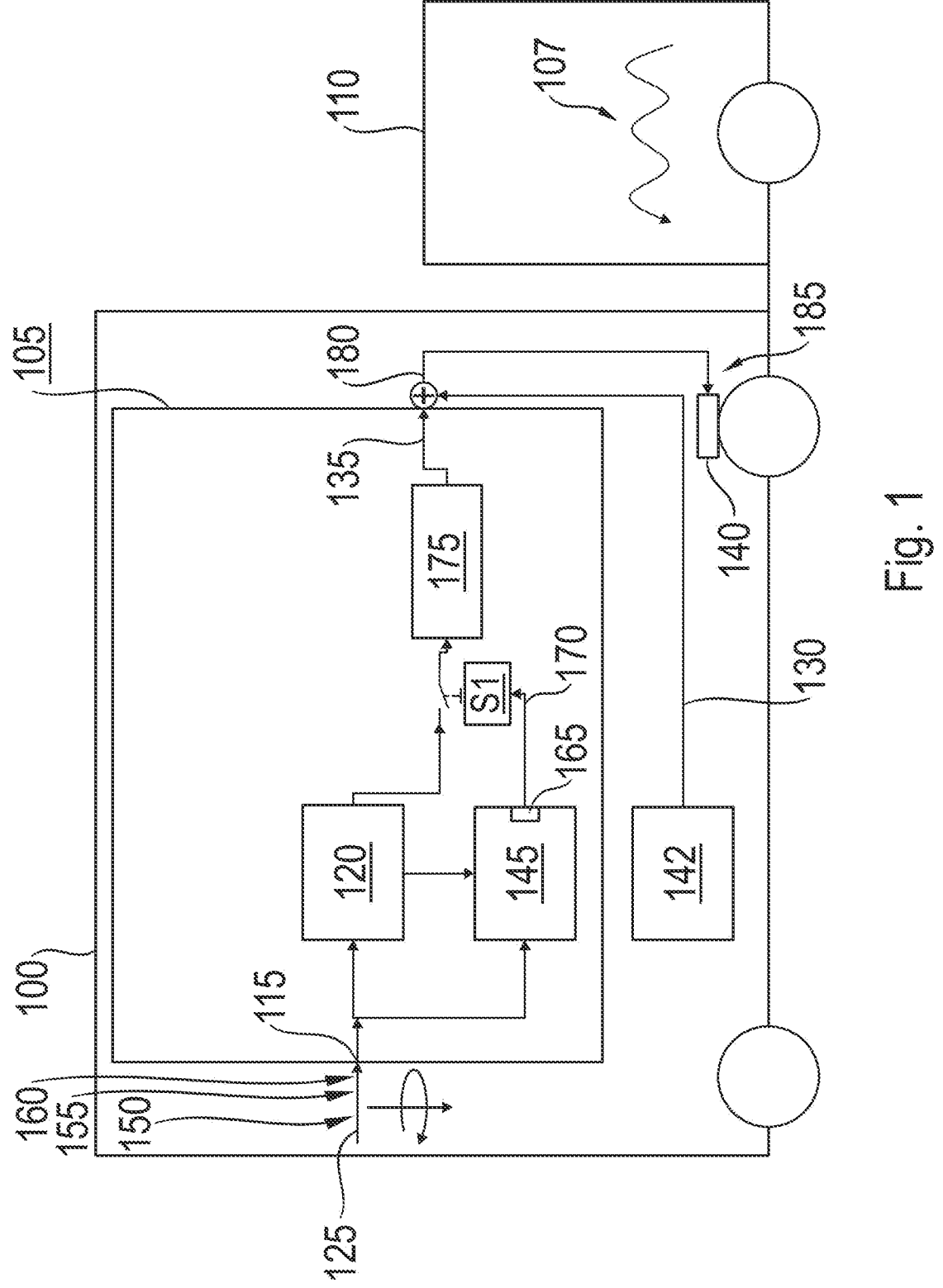
FIG. 1: A schematic representation of a towing vehicle with a compensation
system, according to an example embodiment.

FIG. 1 shows a schematic representation of a towing vehicle 100 with a compensation system 105 according to an example embodiment. The compensation system 105 is designed to compensate a trailer sway 107 of a vehicle trailer 110 attached to the towing vehicle 100. For that purpose, the compensation system 105 comprises a read-in interface 115 and a compensation device 120. The read-in interface 115 is designed to read in a vehicle yaw-rate signal 125 that represents a vehicle yaw-rate and/or a vehicle yaw-rate change of the towing vehicle 100. The compensation device 120 is designed to determine a superposition angle for superposition on a rear-axle steering angle 130 of the towing vehicle 100, at least when the vehicle yaw-rate and/or vehicle yaw-rate change is within a defined vehicle yaw-rate fluctuation range, and/or to emit the superposition angle in the form of a superposition angle signal 135 to a rear-axle steering device 140 of the towing vehicle 100 in order to enable the trailer sway 107 to be compensated.

In this example embodiment, the compensation device 105 is arranged in or on the towing vehicle 100, for example, integrated or implemented in a rear-axle steering device control unit 142 of the rear-axle steering device 140 of the vehicle 100 or connected for signal exchange with the rear-axle steering device control unit 142. The rear-axle steering device control unit 142 is designed to carry out and/or control a basic function of the rear-axle steering device 140, for example, to determine and/or set the rear-axle steering angle 130. In this example embodiment, the rear-axle steering device 140 is an active rear-axle steering system which is designed to carry out a track adjustment at the rear axle of the towing vehicle 100, to decrease the turning circle of the towing vehicle 100, and/or to increase the driving stability. According to an example embodiment, the active rear-axle steering system is designed to change a track angle of the rear wheels, so that a steering function is obtained. In that way, for example, the maneuverability for parking at low speeds and in urban traffic is increased. This is enabled by steering the rear wheels in opposite directions. Thereby, the turning circle of the vehicle is made smaller. On the other hand, steering the rear wheels in the same direction stabilizes the vehicle at higher speeds (for example, above about 50 km/h), particularly during avoidance and lane-changing maneuvers. The compensation device 105 proposed herein is advantageously constructed with a rear-axle steering system of such type for the compensation of trailer sway 107. The rear-axle steering system is preferably in the form of a steer-by-wire steering system.

During the use of the towing vehicle 100 with a trailer 110, swaying of the trailer 110 can take place, depending on the loading situation. This trailer sway can have a negative effect on the driving behavior and restrict the controllability of the towing vehicle 100, which will also be referred to simply as the "vehicle" in what follows. Furthermore, the swaying behavior of the vehicle-trailer combination is relevant to licensing in various markets. The background, in this context, is that in various markets, in accordance with various standards and legal provisions, tests are needed in order to obtain the respective license for the market concerned. For example, a proviso for a decay constant of the trailer sway under specified conditions may be stated. If the said condition is not fulfilled, the trailer weight under consideration cannot be licensed. With a greater sway tendency it may, therefore, be necessary to reduce the permitted overall weight of the trailer 110.

The concept presented here describes a sequence in the sense of process steps for calculating a rear-axle steering angle in the form of the superposition angle, which actively compensates for trailer sway 107. This greatly reduces the trailer sway 107 of the trailer 110 and the decay time of the trailer sway 107 is made shorter. The driving safety of the unit or vehicle-trailer combination is enhanced and, where appropriate, the permitted trailer weight for vehicle licensing can be increased. Two main constituents of the sequence are described with reference to FIGS. 2 and 3. A sequence for calculating the superposition angle, which can also be referred to as the "target superposition angle", is described in greater detail in FIG. 2 and a sequence for calculating an activation and deactivation condition of the superposition is described in FIG. 3.

In this example embodiment, the compensation system 100 also comprises a recognition device 145, which, using the vehicle yaw-rate signal 125, is designed to recognize a vehicle yaw-rate and/or a vehicle yaw-rate change within the defined vehicle yaw-rate fluctuation range as an unacceptable yaw-rate, and/or on the basis of the unacceptable yaw-rate and/or using at least one steering-wheel angle signal 150 which represents a set steering-wheel angle of the towing vehicle 100, and/or a speed signal 155 which represents a vehicle speed of the towing vehicle 100, and/or a steering-wheel angular speed signal 160 that represents a steering-wheel angular speed of a steering-wheel angle of the towing vehicle 100, and is also designed to generate an activation signal 170 for activating the compensation device 120 by means of an activation device 165. In this example embodiment, the compensation device 120 is designed, in response to the said activation signal 170 from the recognition device 145, to be activated in order to determine the superposition angle. In an example embodiment, the compensation device 120 is designed to be activated only in response to the activation signal 170 and/or to remain inactive or be deactivated in the absence of an activation signal 170. According to this example embodiment, the activation signal 170 is designed to close a switch S1, between the recognition device 145 and the compensation device 120, in order to connect electrically the recognition device 145 and the compensation device 120. In this example embodiment, the switch S1 is or remains open unless the activation signal 170 is applied.

According to this example embodiment, the compensation system 100 further comprises a limiting device 175, which is designed to limit the superposition angle determined by the compensation device 120 and/or to change a total angle 180 which is to have or has had the superposition angle superposed upon it, as regards to an angle size and/or an angular speed.

A system consisting of the compensation system 100 and the rear-axle steering device 140 and/or the rear-axle steering device control unit 142 can also be referred to as a rear-axle steering system 185.

Figure 2:
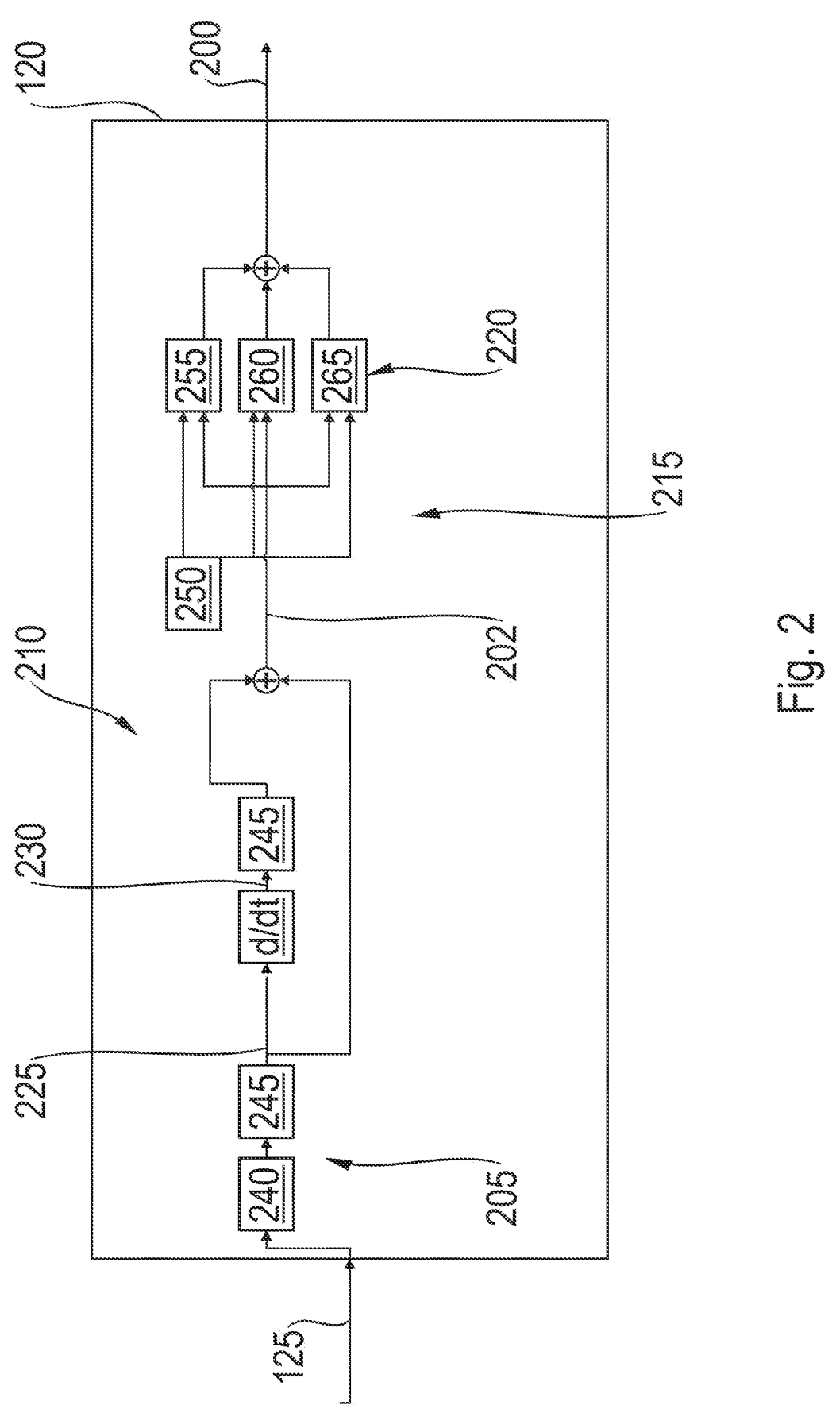
FIG. 2: A schematic representation of a compensation device of a compensation system, according to an example embodiment.

FIG. 2 shows a schematic representation of a compensation system according to an example embodiment. This can be the compensation device 120 described in FIG. 1.

The compensation device 120 is designed to use a sequence for the calculation of the superposition angle 200, which can also be referred to as the "target superposition angle". The trailer sway is generally coupled with the vehicle yaw-rate and can be measured therein, since, for example, when the vehicle is towing the trailer behind it, the trailer tugs the rear of the vehicle as a result of the drag torque. According to this example embodiment, from the vehicle yaw-rate signal 125, only for example by way of a filter cascade can the frequency range that is characteristic of trailer sways be isolated. For this, according to an example embodiment, both a vehicle yaw-rate and also a vehicle yaw-rate change in the typical frequency range is/are interpreted as an unacceptable yaw-rate 202 and compensated for by a PID controller. The starting magnitude is the superposition angle 200, which is added to the normal rear-axle steering angle, which latter can also be referred to as the "target rear-axle angle". According to an example embodiment, using at least one signal derived from the vehicle yaw-rate signal 125, a multiplication and/or, if necessary, a sign correction can be carried out.

In this example embodiment, the compensation device 120 comprises at least a filter system 205, a differentiation device d/dt, a mixer 210 and/or an unacceptable-yaw-rate recognition unit 215 with a regulator 220. The filter system 205 is designed, on the basis of the vehicle yaw-rate signal 125, to generate a filter signal 225 that corresponds to a defined frequency range of the trailer sway. The differentiation device d/dt, in this example embodiment, is designed to differentiate the filter signal 220 in order to obtain a differentiated signal 230. The mixer 210, in this example embodiment, is designed to mix the differentiated signal 230 with a further signal or to amplify the differentiated signal 230. According to this example embodiment, the unacceptable-yaw-rate recognition unit 215 is designed to interpret a vehicle yaw-rate and/or vehicle yaw-rate change in the defined frequency range as an unacceptable yaw-rate 202. In this example embodiment, the regulator 220 is designed to compensate the vehicle yaw-rate and/or vehicle yaw-rate change interpreted as an unacceptable yaw-rate 202, in order to determine the superposition angle 200. In this example embodiment, the filter system 205 is designed, by way of a filter cascade, to isolate a frequency range characteristic of trailer sway as the said defined frequency range, in order to determine the filter signal 225.

According to this example embodiment, the filter system 205 comprises at least a high-pass filter 240 and/or a low-pass filter 245. In this example embodiment, the unacceptable-yaw-rate recognition unit 215 is designed, using a stored set-point error value 250, to operate the regulator 220 in order to determine the superposition angle signal and the superposition angle 200. In this example embodiment, the set-point error value 250 is zero. The regulator 220 in this example embodiment comprises, at least as part-regulators, at least a P-control function 255, an I-control function 260 and/or a D-control function 265. In this example embodiment the regulator 220 is in the form of a PID controller.

Figure 3:
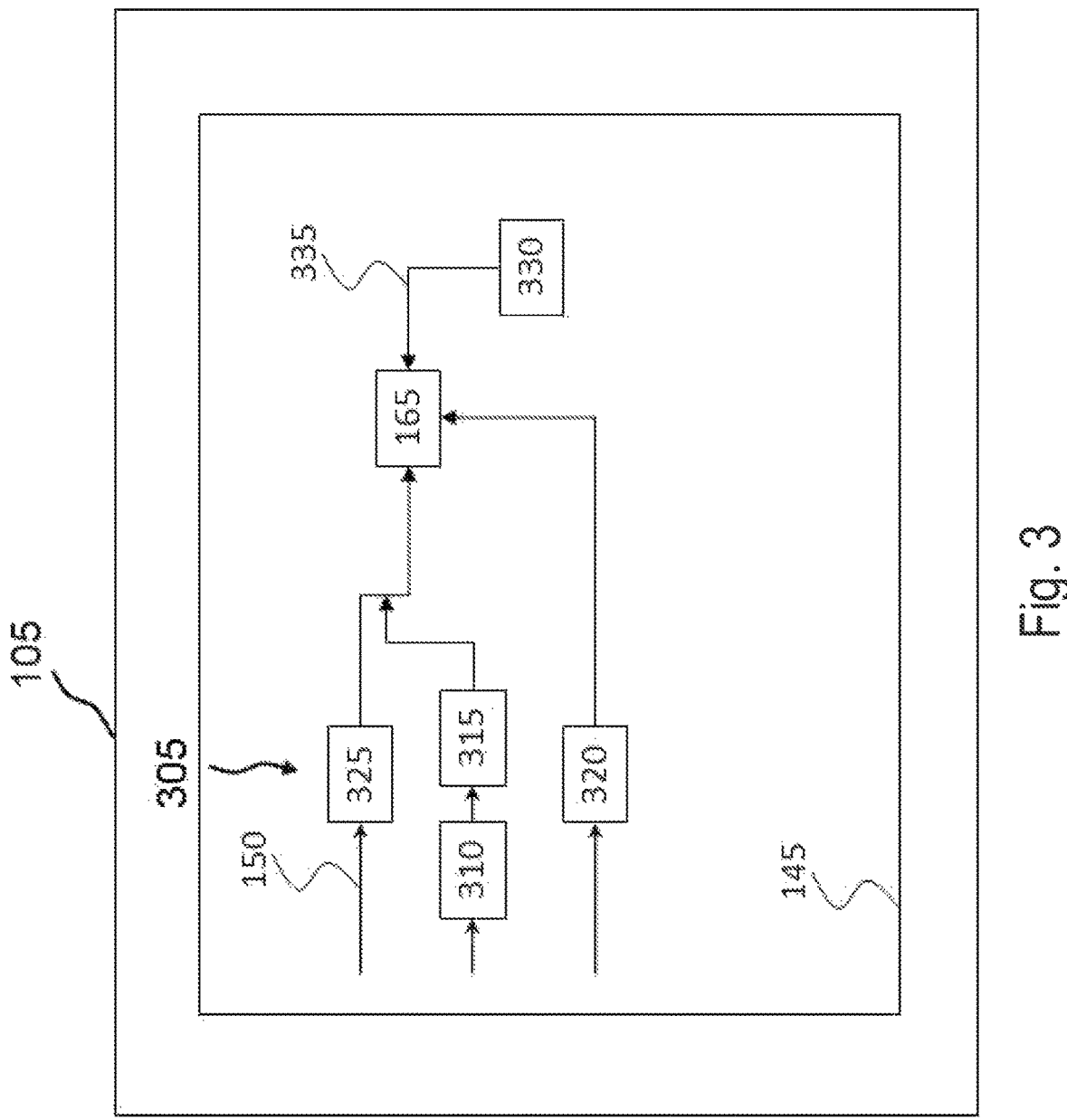
FIG. 3: A schematic representation of a recognition device of a compensation system, according to an example embodiment.

FIG. 3 shows a schematic representation of a recognition device 145 of a compensation system 120 according to an example embodiment. This can be the recognition device 145 described in FIG. 1.

The recognition device 145 is designed to use a sequence for calculating the activation and deactivation condition of the superposition. In this example embodiment, the activation of the rules described in FIG. 2 for compensating sway, which can be carried out by the recognition device 145, is permitted only in situations typical of trailer sway. For this, according to the present example embodiment, a situation recognition is carried out on the basis of steering-wheel angular speed, unacceptable yaw rate and/or the output from the compensation sequence. To determine the unacceptable yaw rate, the recognition device 145 comprises a determination device, which is designed to determine a target yaw-rate by means of a vehicle model such as a single-track model on the basis of the vehicle speed and the steering angle. Furthermore, in this example embodiment, the recognition device 145 comprises a condition-checking device 305. For example, if for the vehicle yaw-rate, the steering-wheel angular speed and/or the superposition angle, many or all the entry conditions of the condition-checking device 305 are fulfilled, then according to this example embodiment, the compensation device is activated for a minimum activation time. If, when the said minimum activation time has lapsed, the amplitude of the trailer sway and the compensation angle fall below a threshold value, then the compensation device is deactivated in this example embodiment.

According to this example embodiment, the activation device 165 is designed to emit the activation signal 170 for activating the compensation device when at least one condition or all the conditions of the condition-checking device 305, for example, those pertaining to the vehicle yaw-rate, the steering-wheel angular speed and/or the superposition angle, is or are fulfilled. In this example embodiment, the activation device 165 is designed to emit the activation signal 170 when, as the condition, the vehicle yaw-rate reaches or exceeds a maximum yaw-rate threshold value 310, and/or the vehicle yaw-rate change reaches or exceeds a maximum yaw-rate change threshold value 315, and/or a steering-wheel angular speed of the towing vehicle reaches or exceeds a maximum steering-wheel angular speed threshold value 320, and/or a difference between the vehicle yaw-rate and a determined target yaw-rate reaches or exceeds a maximum difference threshold value 325. For that purpose, the condition-checking device 305 comprises respectively associated threshold value comparison devices for comparison with the stored threshold values 210, 315, 320 and 325 in each case. In an example embodiment, reaching or exceeding the maximum difference threshold value 325 is interpreted as an unacceptable yaw-rate. According to various example embodiments, the activation device 165 is designed to emit the activation signal 170 only when a certain number or all of the said conditions are fulfilled. Thus, in an example embodiment, the compensation device is advantageously deactivated when, after a trailer sway has been compensated by the superposition signal, the vehicle trailer is no longer swaying or whipping.

In this example embodiment, the recognition device 145 also comprises a deactivation device 330, which is designed to emit a deactivation signal 335 for deactivating the compensation device when the condition is not fulfilled and/or when a defined time period has lapsed since the output of the activation signal 170. To recognize the lapse of the said defined time period, in this example embodiment, the recognition device 145 comprises a time recognition device, which is designed, after the lapse of the defined time interval from the output of the activation signal 170, to emit a lapse recognition signal for the deactivation device 330.

The deactivation device 330 is, for example, designed to emit the deactivation signal 335 when, after the lapse of the minimum activation time, the amplitude of the trailer sway is below a threshold value and/or after the lapse of the minimum activation time the superposition angle is below another threshold value. In this example embodiment the recognition device 145 is further designed to receive the superposition angle 200 determined by the compensation device, and the activation device 165 is designed to emit the activation signal 170 if, as the condition, the superposition angle 200 reaches or exceeds a threshold angle value. An integrator is connected, according to an embodiment, between a receiving interface for receiving the superposition angle 200 and a threshold value comparison device with the stored threshold angle. In this example embodiment, the activation device 165 is further designed to emit the activation signal 170 when, as the condition, the superposition angle 200 reaches or exceeds a further threshold angle.

In this example embodiment the condition-checking device 305 further comprises a first time-limiting device, which is designed to limit an output time of a first condition-fulfillment signal which is emitted when, as the condition, the maximum yaw-rate threshold value 310, the maximum yaw-rate change threshold value 315 and/or the maximum difference threshold value 325 is/are reached or exceeded. In this example embodiment, the condition-checking device 305 further comprises a second time-limiting device, which is designed to limit an output time of a second condition-fulfillment signal, which signal is emitted when, as the condition, the maximum steering-wheel angular speed threshold value 320 is reached or exceeded.

Figure 4:
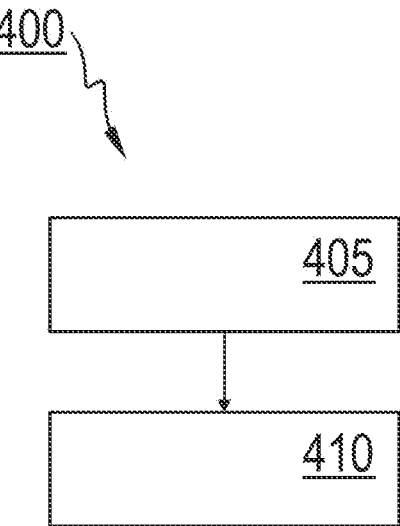
FIG. 4: A sequence diagram of a method, according to an example embodiment, for compensating the trailer sway of a vehicle trailer for a towing vehicle.

FIG. 4 shows a sequence diagram of a method 400, according to an example embodiment, for compensating a trailer sway of a vehicle trailer for a towing vehicle. This method can be carried out and/or controlled with reference to a compensation system described in FIGS. 1 to 3.

The method comprises a read-in step 405 and a determination step 410. In the read-in step 405, a vehicle yaw-rate signal is read in, which represents a vehicle yaw-rate and/or a yaw-rate change of the towing vehicle. In the determination step 410, a superposition angle for superposition on a rear-axle steering angle of the towing vehicle is determined, when the vehicle yaw-rate and/or yaw-rate change is within a defined vehicle-yaw-rate fluctuation range, and/or the superposition angle is emitted in the form of a superposition angle signal to a rear-axle steering device of the towing vehicle in order to enable the compensation of the trailer sway.

The example embodiments described and illustrated in the figures are only chosen as examples. Different example embodiments can be combined with one another completely or in relation to individual features. Moreover, one example embodiment can be supplemented with features of another example embodiment.

Furthermore, the process steps presented herein can be repeated and carried out in a sequence other than the sequence described.

INDEXES d/dt Differentiation device
S1 Switch
100 Towing vehicle
105 Compensation system
107 Trailer sway
110 Vehicle trailer
115 Read-in interface
120 Compensation device
125 Vehicle yaw-rate signal
130 Rear-axle steering angle
135 Superposition angle signal
140 Rear-axle steering device
142 Rear-axle steering device control unit
145 Recognition device
150 Steering-wheel angle signal
155 Speed signal
160 Steering-wheel angular speed signal
165 Activation device
170 Activation signal
175 Limiting device
180 Total angle
185 Rear-axle steering system
200 Superposition angle
202 Unacceptable yaw-rate
205 Filter system
210 Mixer
215 Unacceptable-yaw-rate recognition unit
220 Controller 225 Filter signal
230 Differentiated signal
240 High-pass filter
245 Low-pass filter
250 Target error value
255 P-control function
260 I-control function
265 D-control function
305 Condition-checking device
310 Maximum yaw-rate threshold value
315 Maximum yaw-rate change threshold value
320 Maximum steering-wheel angular speed threshold value
325 Maximum difference threshold value
330 Deactivation device
335 Deactivation signal
400 Method for compensating a trailer sway of a vehicle trailer for a towing vehicle
405 Read-in step
410 Determination and/or output step

The invention claimed is:

1. A compensation system for a towing vehicle, for compensating a trailer sway of a vehicle trailer, wherein the compensation system comprises:
a read-in interface, which is configured to read in a vehicle yaw-rate signal that represents a vehicle yaw-rate and/or a vehicle yaw-rate change of the towing vehicle, and
a compensation device, which is configured to at least one of:
determine a superposition angle for superposition on a rear-axle steering angle of the towing vehicle, when at least one of the vehicle yaw-rate and the vehicle yaw-rate change is within a defined vehicle yaw-rate fluctuation range, and
emit the superposition angle in the form of a superposition angle signal to a rear-axle steering device of the towing vehicle, to enable the compensation of the trailer sway.

2. The compensation system according to claim 1, further comprising a recognition device which is configured to at least one of:
on a basis of the vehicle yaw-rate signal, to recognize at least one of the vehicle yaw-rate and the vehicle yaw-rate change within the defined vehicle yaw-rate fluctuation range as an unacceptable yaw-rate, and
on a basis of at least one of the unacceptable yaw-rate and using at least one steering-wheel angle signal that represents at least one of a set steering-wheel angle of the towing vehicle, and a speed signal that represents a vehicle speed of the towing vehicle, and a steering-wheel angular speed signal that represents a steering-wheel angular speed of a steering-wheel angle of the towing vehicle, to generate an activation signal by means of an activation device for activating the compensation device.

3. The compensation system according to claim 1, wherein the compensation device is configured to be activated in response to an activation signal from a recognition device, in order to determine the superposition angle.

4. The compensation system according to claim 1, further comprising a limiting device, which is configured to limit at least one of the superposition angle determined by the compensation device and a total angle that is to have the superposition angle superposed thereon, in relation to at least one of an angle size and an angular speed of a steering orientation rate of a wheel.

5. The compensation system according to claim 1, wherein the compensation device comprises at least one of a filter system, a differentiation device (d/dt), a mixer and an unacceptable-yaw-rate recognition unit with a controller, wherein at least one of
the filter system is configured, on a basis of the vehicle yaw-rate signal, to generate a filter signal that corresponds to a defined frequency range of the trailer sway, and
the differentiation device (d/dt) is configured to differentiate the filter signal in order to obtain a differentiated signal, and
the mixer is configured to mix the differentiated signal with a further signal or to amplify the differentiated signal, and
the unacceptable-yaw-rate recognition unit is configured to interpret at least one of the vehicle yaw-rate and the vehicle yaw-rate change in a defined frequency range as an unacceptable yaw-rate, and
the controller is configured to determine the superposition angle, in order to compensate the at least one of the vehicle yaw-rate and the vehicle yaw-rate change which has been interpreted as an unacceptable yaw-rate.

6. The compensation system according to claim 5, wherein the filter device comprises at least one of a high-pass filter and a low-pass filter.

7. The compensation system according to claim 5, wherein the controller comprises as part-regulators at least one of a P-control function, an I-control function and a D-regulation control, such that the controller is in the form of a PID controller.

8. The compensation system according to claim 1, wherein the recognition device comprises a condition-checking device and an activation device, the activation device is configured to emit an activation signal for activating the compensation device when at least one condition of a condition-checking device is fulfilled, the condition of the condition-checking device is fulfilled when at least one of the vehicle yaw-rate reaches or exceeds a maximum yaw-rate threshold value, and the vehicle yaw-rate change reaches or exceeds a maximum yaw-rate change threshold value, and a steering-wheel angular speed of the towing vehicle reaches or exceeds a maximum steering-wheel angular speed threshold value, and a difference between the vehicle yaw-rate and a determined target yaw-rate reaches or exceeds a maximum difference threshold value.

9. The compensation system according to claim 8, wherein the activation device is configured to emit the activation signal for a predetermined time period.

10. The compensation system according to claim 8, wherein the recognition device comprises a deactivation device, which is configured to emit a deactivation signal for deactivating the compensation device at least one of when the condition is not fulfilled and when a predetermined time period has lapsed after the output of the activation signal.

11. A rear-axle steering system with a rear-axle steering device and a compensation system according to claim 1.

12. A control unit for operating a compensation system according to claim 1, designed to carry out a method for compensating a trailer sway of a vehicle trailer of a towing vehicle including steps of:
reading in of a vehicle yaw-rate signal which represents at least one of a vehicle yaw-rate and a vehicle yaw-rate change of the towing vehicle; and
determining a superposition angle for superposition on a rear-axle steering angle of the towing vehicle, when the at least one of the vehicle yaw-rate and the vehicle yaw-rate change is within a defined vehicle yaw-rate fluctuation range, and output of the superposition angle in a form of a superposition angle signal to a rear-axle steering device of the towing vehicle in order to enable the compensation of the trailer sway.

13. A compensation system for a towing vehicle, for compensating a trailer sway of a vehicle trailer, wherein the compensation system comprises:

a read-in interface, which is configured to read in a vehicle yaw-rate signal that represents one of a vehicle yaw-rate and a vehicle yaw-rate change of the towing vehicle, and a compensation device, which is configured to at least one of determine a superposition angle for superposition on a rear-axle steering angle of the towing vehicle, when at least one of the vehicle yaw-rate and the vehicle yaw-rate change is within a defined vehicle yaw-rate fluctuation range, and emit the superposition angle in the form of a superposition angle signal to a rear-axle steering device of the towing vehicle, to enable the compensation of the trailer sway, wherein the compensation device comprises at least one of a filter system, a differentiation device, a mixer and an unacceptable-yaw-rate recognition unit with a controller, wherein at least one of the filter system is configured, on a basis of the vehicle yaw-rate signal, to generate a filter signal that corresponds to a defined frequency range of the trailer sway, and the differentiation device is configured to differentiate the filter signal in order to obtain a differentiated signal, and the mixer is configured to mix the differentiated signal with a further signal or to amplify the differentiated signal, and the unacceptable-yaw-rate recognition unit is configured to interpret at least one of the vehicle yaw-rate and the vehicle yaw-rate change in a defined frequency range as an unacceptable yaw-rate, and the controller is configured to determine the superposition angle, in order to compensate the at least one of the vehicle yaw-rate and the vehicle yaw-rate change which has been interpreted as an unacceptable yaw-rate, and wherein the unacceptable-yaw-rate recognition unit is configured to operate the controller, on a basis of a stored target error value, in order to determine the superposition angle signal.

14. A method for compensating a trailer sway of a vehicle trailer of a towing vehicle, wherein the method comprises the steps of:

reading in of a vehicle yaw-rate signal which represents at least one of a vehicle yaw-rate and a vehicle yaw-rate change of the towing vehicle, and determining a superposition angle for superposition on a rear-axle steering angle of the towing vehicle, when at least one of the vehicle yaw-rate and the vehicle yaw-rate change is within a defined vehicle yaw-rate fluctuation range, and output of the superposition angle in a form of a superposition angle signal to a rear-axle steering device of the towing vehicle in order to enable the compensation of the trailer sway.

15. A computer program, which is configured to at least one of carry out and control the steps of the method according to claim 14.

16. A machine-readable storage medium, on which the computer program according to claim 15 is stored.

\* \* \* \* \*